(12) United States Patent
Huber et al.

(10) Patent No.: US 9,840,826 B2
(45) Date of Patent: Dec. 12, 2017

(54) INTERCHANGEABLE INTERFACE SYSTEM FOR WORK VEHICLE

(71) Applicant: Deere & Company, Moline, IL (US)

(72) Inventors: Ronald J. Huber, Dubuque, IA (US); Giovanni A. Wuisan, Epworth, IA (US)

(73) Assignee: Deere & Company, Moline, IL (US)

( * ) Notice: Subject to any disclaimer, the term of this patent is extended or adjusted under 35 U.S.C. 154(b) by 81 days.

(21) Appl. No.: 15/077,550

(22) Filed: Mar. 22, 2016

(65) Prior Publication Data

US 2017/0275851 A1 Sep. 28, 2017

(51) Int. Cl.
*E02F 9/20* (2006.01)
*G06F 3/048* (2013.01)
*E02F 3/76* (2006.01)

(52) U.S. Cl.
CPC .......... *E02F 9/2004* (2013.01); *E02F 3/7636* (2013.01); *G06F 3/048* (2013.01)

(58) Field of Classification Search
CPC ........ E02F 9/2004; E02F 3/7636; G06F 3/048
USPC .................................................. 180/333, 334
See application file for complete search history.

(56) References Cited

U.S. PATENT DOCUMENTS

| H1831 H | 2/2000 | Kelley et al. |
| 7,497,298 B2 | 3/2009 | Shearer et al. |
| 8,651,220 B2 * | 2/2014 | Connor ................. E02F 9/2004 180/326 |
| 8,757,315 B1 | 6/2014 | Wuisan et al. |
| 9,481,979 B2 * | 11/2016 | Hiraoka ................. E02F 3/325 |
| 2009/0223734 A1 | 9/2009 | Frett et al. |

* cited by examiner

*Primary Examiner* — Faye M Fleming
(74) *Attorney, Agent, or Firm* — Lorenz & Kopf, LLP

(57) ABSTRACT

An interchangeable operator interface system for a work vehicle has at least one controller, at least one operator interface device having a plurality of controls, and at least one interface device docking arrangement. The docking arrangement removably mounts different interface devices to alternatively physically connect them to the work vehicle and operatively couple them to the controller. Different operator interface devices have at least one common control that operates in a different mode of operation and/or in a different physical layout on the associated operator interface device. The controller is configured to effect an associated common change in state of an associated component of the work vehicle upon receiving a control input from the different common controls.

20 Claims, 7 Drawing Sheets

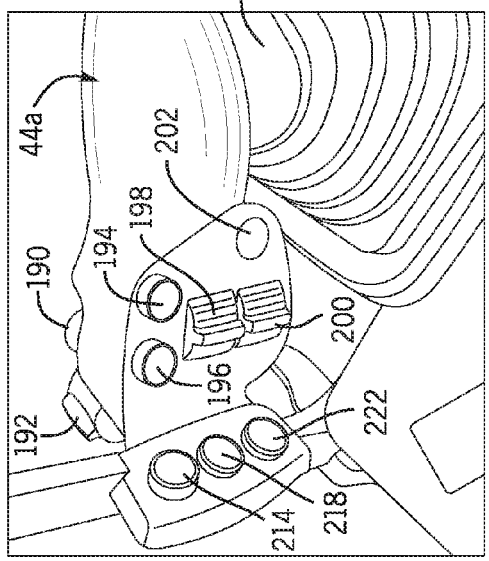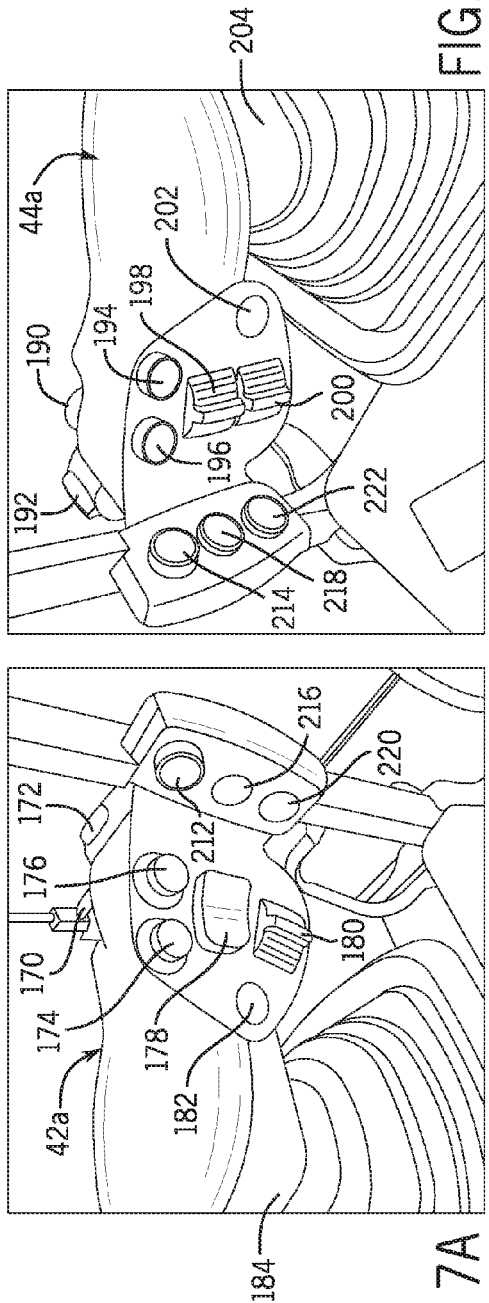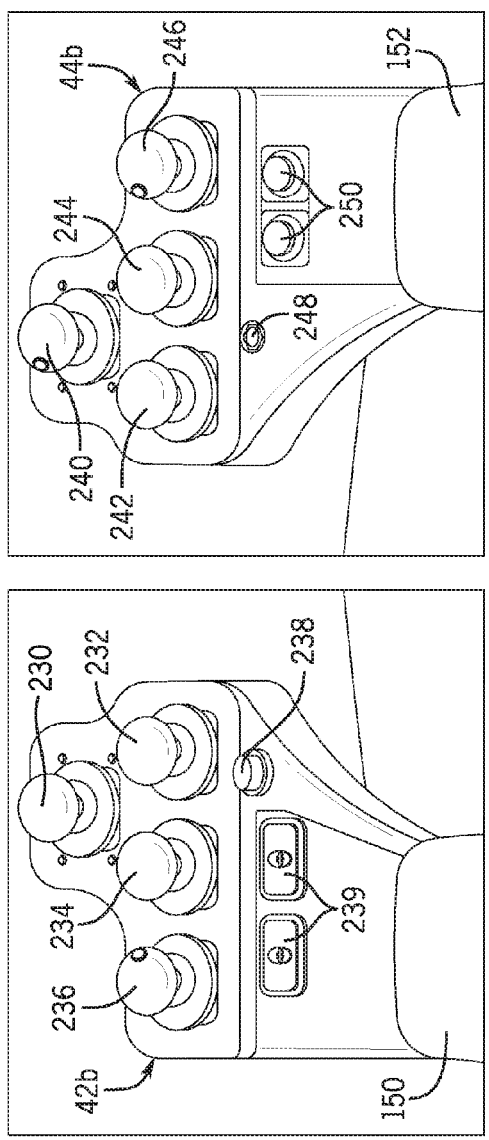

INTERCHANGEABLE INTERFACE SYSTEM FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to operator control of work vehicles, such as motor graders.

BACKGROUND OF THE DISCLOSURE

Heavy equipment operators often operate large work vehicles using various controls mounted at or near an operator station of the vehicle. In complex vehicles, such as motor graders, the operator may be required to manipulate a large number of controls in succession or simultaneously to operate numerous independent or interdependent subsystems of the vehicle. These may include systems that control vehicle heading rate and direction as well as systems that operate one or more tools or implements carried by the work vehicle.

Effective and efficient operation of the vehicle and its implements may require the operator to perform intricate, hand and arm gestures in order to manipulate the controls required to activate these systems timely and accurately. Imprecise control of the vehicle and its implements can lead to slow working, or re-working, of the area of interest, or it cause more material (e.g., aggregate, asphalt and so) to be used at the area of interest than desired, which is costly. At times, a number of intricate gestures may be required simultaneously or in rapid succession to operate the vehicle effectively and efficiently.

SUMMARY OF THE DISCLOSURE

This disclosure provides a system for work vehicles, such as motor graders and the like, in which the operator interface devices may be interchanged.

In one aspect the disclosure provides an interchangeable operator interface system for a work vehicle. The interchangeable operator interface system has at least one controller, at least one operator interface device selected from a plurality of operator interface devices each having a plurality of controls, and at least one docking arrangement configured to removably mount the operator interface device to physically connect to the work vehicle and operatively couple to the controller. The docking arrangement is configured such that, when the operator interface device is removed from the docking arrangement, the docking arrangement removably mounts another of the operator interface devices to physically connect to the work vehicle and operatively couple to the controller. At least one of the operator interface devices has at least one common control that operates in one or more of a different mode of operation and a different physical layout than that of another at least one common control of another of the operator interface devices. The controller is configured to effect at least one common change in state of at least one component of the work vehicle upon receiving a control input from each of the at least one common controls of the associated operator interface devices.

In another aspect, the disclosure provides an interchangeable operator interface system for a work vehicle having at least one controller, a set of left-hand and right-hand operator interface devices selected from a plurality of operator interface devices each having a plurality of controls, and a set of left-hand and right-hand docking arrangements configured to removably mount the operator interface devices to physically connect to the work vehicle and operatively couple to the controller. The left-hand and right-hand docking arrangements are configured such that, when the left-hand and right-hand operator interface devices are removed, the docking arrangements removably mount another set of left-hand and right-hand operator interface devices to physically connect to the work vehicle and operatively couple to the controller. One set of left-hand and right-hand operator interface devices has at least one common control that operates in one or more of a different mode of operation and a different physical layout than that of at least one common control of another set of left-hand and right-hand operator interface devices. The controller is configured to effect at least one common change in state of at least one component of the work vehicle upon receiving a control input from each of the at least one common controls of the associated set of left-hand and right-hand operator interface devices.

In yet another aspect, the disclosure provides an interchangeable operator interface system for a work vehicle having at least one controller, an operator interface device having a plurality of controls configured to send control signals to the controller, an alternative operator interface device having a plurality of controls configured to send control signals to the controller, and at least one docking arrangement configured to alternatively removably mount the operator interface device and the alternative operator interface device so that each is alternatively physically connected to the work vehicle and alternatively operatively coupled to the controller. The operator interface device has at least one common control that operates in one or more of a different mode of operation and a different physical layout than that of at least one common control of the alternative operator interface device. The controller is configured to effect at least one common change in state of at least one component of the work vehicle upon receiving a control input from each of the at least one common controls of the associated operator interface devices.

The details of one or more embodiments are set forth in the accompanying drawings and the description below. Other features and advantages will become apparent from the description, the drawings, and the claims.

BRIEF DESCRIPTION OF THE DRAWINGS

FIGS. 7A and 7B are partial perspective views showing an example control set for the example joystick devices shown in FIG. 4; and FIGS. 8A and 8B are partial perspective views showing an example control set for the example pod devices shown in FIG. 4

Like reference symbols in the various drawings indicate like elements.

DETAILED DESCRIPTION

Figure 1:
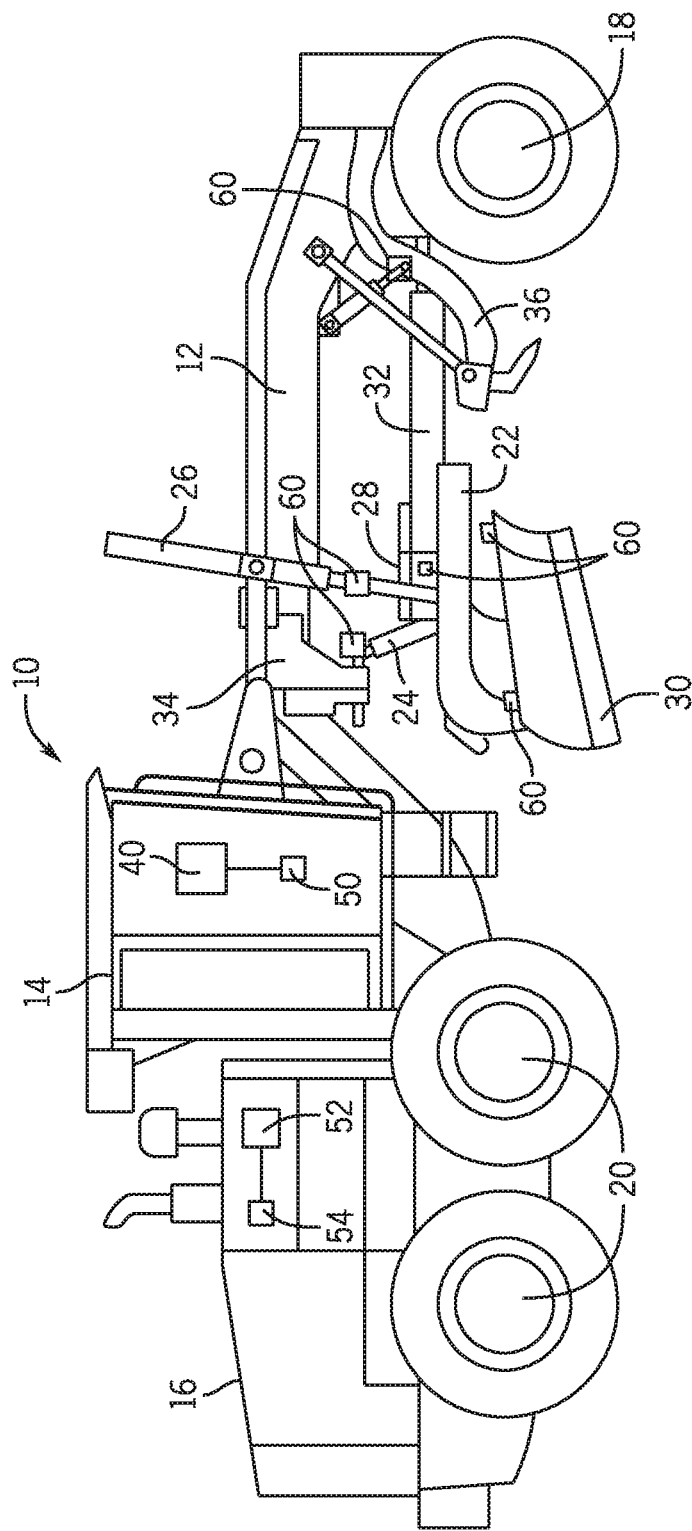
FIG. 1 is a side view of an example work vehicle in the form of a motor grader in which the disclosed interchangeable operator interface system may be used.

The following describes one or more example embodiments of the disclosed interchangeable operator interface system, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "aft," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the tillage implement, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the motor grader described herein is merely one exemplary embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed interchangeable control system for a work vehicle, as shown in the accompanying figures of the drawings described briefly above. Generally, the disclosed control system (and work vehicles in which they are implemented) allow for improved operator control of the work vehicle by using a control scheme familiar to a particular operator in a given machine of a particular type. Discussion herein may sometimes focus on the example application of moving implements of a motor grader, with actuators for moving the implements generally configured as hydraulic cylinders. In other applications, other configurations are also possible. In some embodiments, for example, one or more of the implements may be a blade, a scarifier, a ripper or other known implement. Likewise, work vehicles in some embodiments may be configured as tractors, loaders, dozers or similar machines.

Work vehicles used in various industries, such as the agriculture, construction and forestry industries, may include tools, implements or other sub-systems used to carry out various functions for which the work vehicle was designed. Very often this requires the vehicle operator to be familiar with and operate the vehicle controls necessary to both maneuver the work vehicle and operate the work tools or implements. At times, the operator may need to control vehicle heading and speed simultaneously with operation of the implements. Certain work vehicles, such as those with a number of implements or with implements having multiple degrees of freedom in movement, may be rather complex to operate and require the operator to have considerable related skill and experience. Suboptimal operation of the vehicle or the implements may have costly consequences, for example, in terms of inefficient or imprecise performance at the work site causing extra labor and equipment-related costs or waste of materials at the work site before or after the work is undertaken.

One particularly complex work vehicle is the motor grader, which is generally used in the construction industry to set grade. Modern motor graders are typically large machines with a long wheel base in the fore-aft direction of the vehicle. The large platform gives rise to additional maneuverability-enhancing features being added to the machine, separate and apart from conventional heading and speed control features. For example, motor graders may be outfitted with an articulated chassis in which the front section of the chassis having the steered wheels may pivot with respect to a rear section having the drive wheels, which has the effect of shortening the overall wheel base of the machine. Motor graders may also have the capability to tilt the steered wheels off of the rotational axis of the wheels, in other words to lean the wheels, and thus lean the machine and shift the vehicle's heading, toward either side of the machine. These features thus provide for an improved (i.e., shorter) turning radius, making the large machine more nimble than otherwise possible. Beyond the heading and speed control, motor graders may have a rather complex implement control scheme and one or more implements. The primary tool on motor graders is the moldboard or blade, which is mounted to a turntable known in the industry as a "circle". The circle is adjustably mounted to the vehicle frame, and the blade in turn is adjustably mounted to the circle, thus giving the blade a wide-range of possible movements. Specifically, the circle may be able to raise and lower with respect to the vehicle frame to adjust blade height, either uniformly from heel to toe, or independently to tilt the blade with respect to horizontal. The circle may also be able to shift to a lateral side of the vehicle by pivoting about the main frame so that the angular position of the blade about the vehicle's centerline may change, for example, to work embankments or raised ground to a slide of the machine. The circle may also rotate about a generally vertical axis with respect to the vehicle frame in order to change the angular position of the blade about the vertical axis such that the toe end of the blade may be positioned forward of the heel end of the blade in the fore-aft direction at either side of the vehicle frame. The blade may be mounted to shift laterally side-to-side with respect to the circle to move the blade further toward one side of the machine. The blade may also be capable of tilting in the fore-aft direction with respect to the circle to change its pitch. Various combinations of these operations may be undertaken.

To perform all of the aforementioned functions and operations, motor graders have in the past been outfitted with a relatively large number of mechanical control levers and knobs that may each control operation of a single, discrete operation or motion. In some modern motor graders, the manual mechanical controls have been replaced with electronic controls. Sometimes these controls are arranged in banks of primarily single axis joysticks, which the operator may manipulate forward and backward using his or her fingertips, and which each control a single, discrete function. The operator controls may also be a pair of multi-axis joysticks, which are used to assist control of the vehicle heading and to actuate the circle and blade assembly and other attached implements. A consequence of consolidating the number of controls that need to be manipulated by the operator is that a dual joystick control system requires that a significant number of operations be carried out by each joystick, and thus, each joystick must be manipulated along several axes and carry a large number of control inputs (e.g., switches). Apart from the sheer number of control inputs (e.g., switches and joystick movements), some of the operations may need to be performed in a particular sequence or simultaneously. This compounds the possible number of switch and joystick movements that may be required of the operator.

These issues are further exacerbated by the provision of different operator interfaces in machines of different types, or even different models of machines of the same type, including electro-hydraulic control devices of various types. The various types of interface devices, such as those described above, may have different physical arrangements (e.g., different types and relative or absolute locations of control inputs) and/or different modes of operation (e.g., different types, travel distances and periods of actuation motions). After an operator has acquired proficiency at one type of control scheme, it may be difficult for that operator to operate machines with different control devices, effectively leaving the operator to learn from the start what is to that operator a new machine control scheme. To avoid this issue, some machine owners may purposely maintain (with the attendant machine and maintenance costs) a fleet with machines having different operator control interfaces in order to be able to employ operators having experience with different machine control schemes.

The following discusses aspects of the disclosed control system that address these and other issues, and which are particularly suited for use in large work vehicle platforms with multiple tool features and movements, such as motor graders. The disclosed control system may be used to receive operator commands for movement of the vehicle and/or implements (e.g., in one or more of lowered/raised height positions, left/right lateral positions, front/back fore-aft positions, clockwise/counterclockwise rotated (or "steer angle") positions, and up/down slope (or "tilt angle") positions) in which case the control system may be informed with or resolve a movement associated with the vehicle and/or implement(s) based on the receipt of the operator commands.

The control system disclosed herein provides alternative control schemes by which an operator interfaces with the work vehicle to control its movements and implements. The control system provides the control alternatives, not through the simple provision of redundant, but different interface devices in the same operator cabin, nor by virtually re-mapping the control scheme of a single interface device. Rather, the control system disclosed herein provides alternative control schemes through the physical replacement of an interface device having a control scheme of one type and with a different interface having another control scheme. The alternative interface devices may differ in any of various ways related to the configuration of the interfaces devices.

In certain embodiments, the interface devices are a modular system in which different interface devices may be compatible with a common vehicle control system, thereby allowing for the direct substitution of one interface device for another. In certain embodiments, this may take the form of the interface devices having a common mounting interface by which they may be alternatively coupled to a common mounting arrangement, such one or more device docks within the vehicle cabin. In still further embodiments, such a docking arrangement may have a complementary (e.g., male or female) mounting interface, which may be located in the operator cabin, such as at an operator console or seat. In one particular case, the docking arrangement may be located at the operator seat, being located near or forming a part of the seat arms.

In addition to the physical interchangeability of the interface devices, the control system facilitates implementation and integration of the different control schemes provided by the different interface devices. In certain embodiments, for example, the docking arrangement may provide for direct operational (e.g., electrical) coupling of the control inputs of each interface device with the vehicle controller or controllers. The controllers(s) may be configured to effectuate the different controls of different interface devices without further configuration or calibration input by the operator.

With reference to the drawings, one or more example implementations of the interchangeable operator interface system will now be described. While a motor grader is illustrated and described herein as an example work vehicle, one skilled in the art will recognize that principles of the operator control arrangement disclosed herein may be readily adapted for use in other types of work vehicles, including, for example, various crawler dozer, loader, backhoe and skid steer machines used in the construction industry, as well as various other machines used in the agriculture and forestry industries. As such, the present disclosure should not be limited to applications associated with motor graders or the particular example motor grader shown and described.

Figure 2:
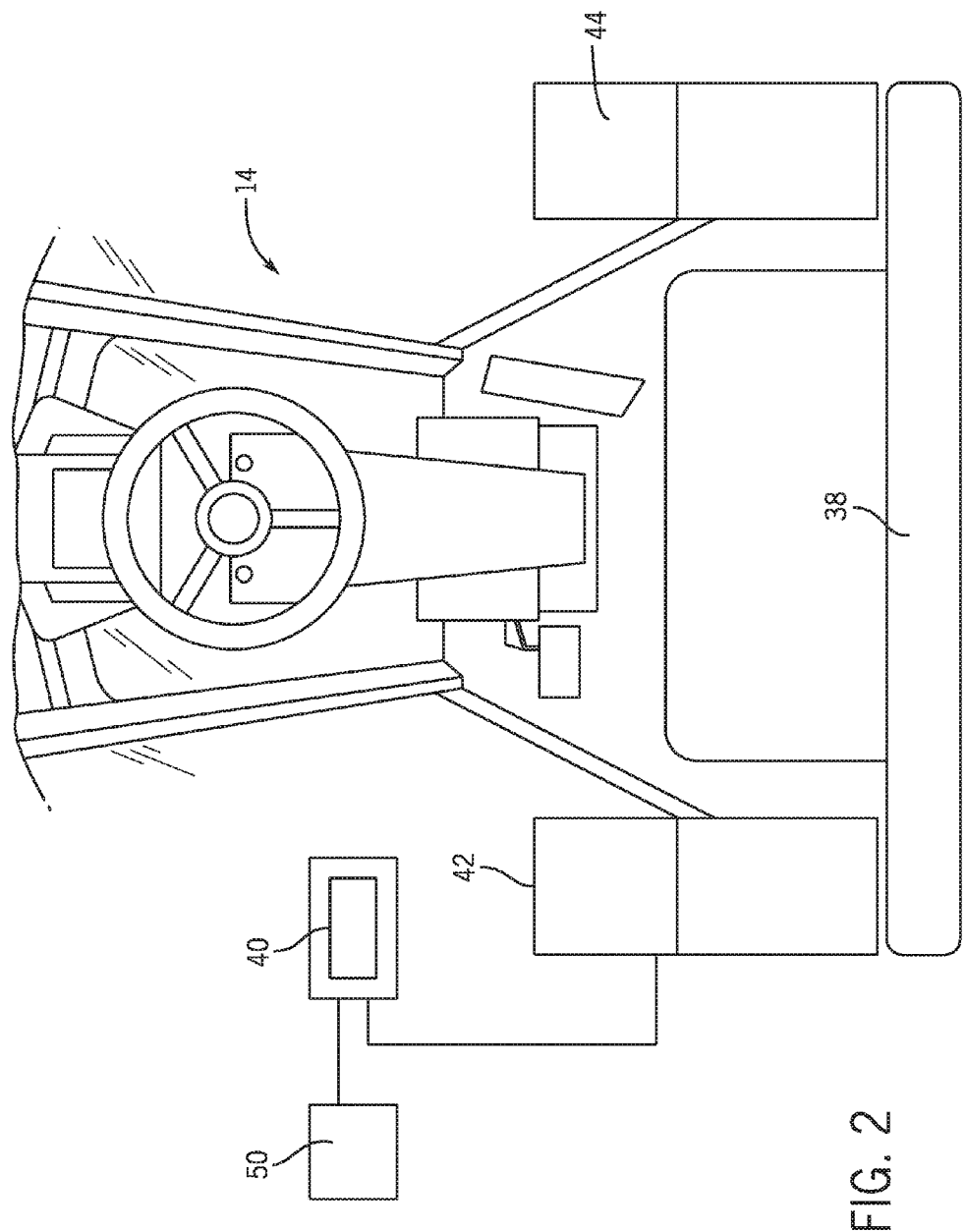
FIG. 2 is simplified view inside an operator cabin of the work vehicle of FIG. 1, showing example operator controls.

As shown in FIGS. 1 and 2, a work vehicle 10 in the form of a motor grader may include a chassis or main frame 12 supporting an operator cabin 14 and a power plant 16 (e.g., a diesel engine, an electric motor, etc.) operably coupled to power a drivetrain. The main frame 12 is supported off of the ground by ground-engaging steered wheels 18 at the front of the machine and by two pairs of tandem drive wheels 20 at the rear of the machine. The power plant 16 may power a hydraulic circuit described in more detail below. In the illustrated example, the main frame 12 has an articulation joint (not shown) between the operator cabin 14 and the power plant 16 that allows the front section of the main frame 12 to deviate from the centerline of the rear section of the main frame 12, such as during a turning operation, to shorten the effective wheelbase, and thus the turning radius, of the work vehicle 10. The articulation joint may be pivoted by one or more associated hydraulic actuators (not shown).

A circle 22 and blade 30 assembly is mounted to the main frame 12 in front of the operator cabin 14 by a drawbar 32 and a lifter bracket 34, which in certain embodiments may be pivotal with respect to the main frame 12 or otherwise movable into different orientations. Blade shift actuators 24 may be mounted between the circle 22 and the blade 30 for extension of the blade 30 in either sideways direction. Blade lift actuators 26 may be mounted between the circle 22 and the lifter bracket 34 to raise, lower and tilt (side-to-side) the circle 22, and thereby the blade 30. A circle drive 28 may be mounted to the drawbar 32 to cause the circle 22 and the blade 30 to be rotated relative to a vertical axis (or otherwise upright axis relative to the main frame 12). Other implement attachments may be included in the work vehicle 10, for example, a scarifier 36 mounted to the front of the main frame 12 with associated hydraulic components to raise and lower the scarifier 36.

The operator cabin 14 provides an enclosure for an operator seat 38 and an operator console for mounting various control devices (e.g., steering wheel, accelerator and brake pedals), communication equipment and other instruments used in the operation of the work vehicle 10. The operator cabin 14 has a control interface including an operator control display 40, providing graphical (or other) input controls and feedback, and a control input interface device, such as including left and right operator control interface devices 42, 44, which may be mounted in the operator cabin 14 at each side of the operator seat 38, as described in detail below. In certain embodiments, as also described in detail below, the interface devices 42, 44 may be joystick controls, such as multi-axis joysticks with numerous control inputs (e.g., buttons, rollers, switches, joystick movements, etc.) on each joystick for controlling numerous machine and implement functions, or they may be banks of multiple individual single- or dual-axis joysticks, where each joystick controls only one or two functions. It should be understood, however, that the interface devices may have other configurations than those shown in the figures of the drawings and described below.

The control display 40 and the interface devices 42, 44 are operatively connected to one or more controllers, such as controller 50. The control display 40 and the interface devices 42, 44 provide control inputs to the controller 50, which cooperates to control various electro-hydraulic valves to actuate the various drives and actuators of the hydraulic circuit. The controller 50 may provide operator feedback inputs to the control display 40 for various parameters of the machine, implement(s) or other sub-systems. Further, the control display 40 may act as an intermediary between the interface devices 42, 44 and the controller 50 to set, or allow the operator to set or select, the mapping or functionality of one or more of controls (e.g., switches or joystick movements) of the interface devices 42, 44.

The controller 50 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 50 may be configured to execute various computational and control functionality with respect to the work vehicle 10 (or other machinery). In some embodiments, the controller 50 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 50 (or a portion thereof) may be configured as an assembly of hydraulic components (e.g. valves, flow lines, pistons and cylinders, and so on), such that control of various devices (e.g., pumps or motors) may be effected with, and based upon, hydraulic, mechanical, or other signals and movements.

The controller 50 may be in electronic, hydraulic, mechanical, or other communication with various other systems or devices of the work vehicle 10 (or other machinery). For example, the controller 50 may be in electronic or hydraulic communication with various actuators, sensors, and other devices within (or outside of) the work vehicle 10, including various devices associated with the one or more pumps 52, control valves 54, and so on. The controller 50 may communicate with other systems or devices (including other controllers) in various known ways, including via a network bus (not shown) of the work vehicle 10, via wireless or hydraulic communication means, or otherwise. The controller 50 may be mounted in any suitable location onboard the work vehicle 10 or at various remote locations.

Various sensors 60 (FIGS. 1 and 3) may also be provided to observe various conditions associated with the components of the work vehicle and implements. In some embodiments, various sensors may be disposed on or near components of the machine used to control vehicle movement and heading (e.g., the articulation joint, the steered wheels 18, various components of the drivetrain (e.g., the transmission) and so on), and various sensors may be disposed on or near components of the implements (e.g., the blade 30, the circle 22, the scarifier 36 and so on). In some embodiments, the sensors 60 may include angle sensors to detect rotational angle orientations of the components (e.g., the circle 22 and/or the blade 30), linear sensors to detect the "length" of an associated hydraulic cylinder, or inertial measurement units (IMUs) or microelectromechanical sensors (MEMs) that observe a force of gravity and an acceleration associated with the components. The various components noted above (or others) may be utilized to control movement of the components via control of the movement of the one or more hydraulic actuators (e.g., hydraulic actuators 24, 26, 28).

Accordingly, the actuation components may be viewed as forming part of the control system for the work vehicle 10. Each of the sensors 60 may be in communication with the controller 50 via a suitable communication architecture.

In certain embodiments, the controller 50 outputs one or more control signals or control commands to the components (e.g., to actuators 24, 26, 28 associated with the blade 30 and the scarifier 36) based on one or more of the sensor signals received from the sensors 60 and/or inputs received from the operator via the interface devices 42, 44. The controller 50 outputs the one or more control signals or control commands to the pumps 52 and/or control valves 54 associated with hydraulic actuators (e.g., hydraulic actuators 24, 26, 28) based on one or more of the sensor signals received from the sensors 60 and input received from the input devices 42, 44.

Figure 3:
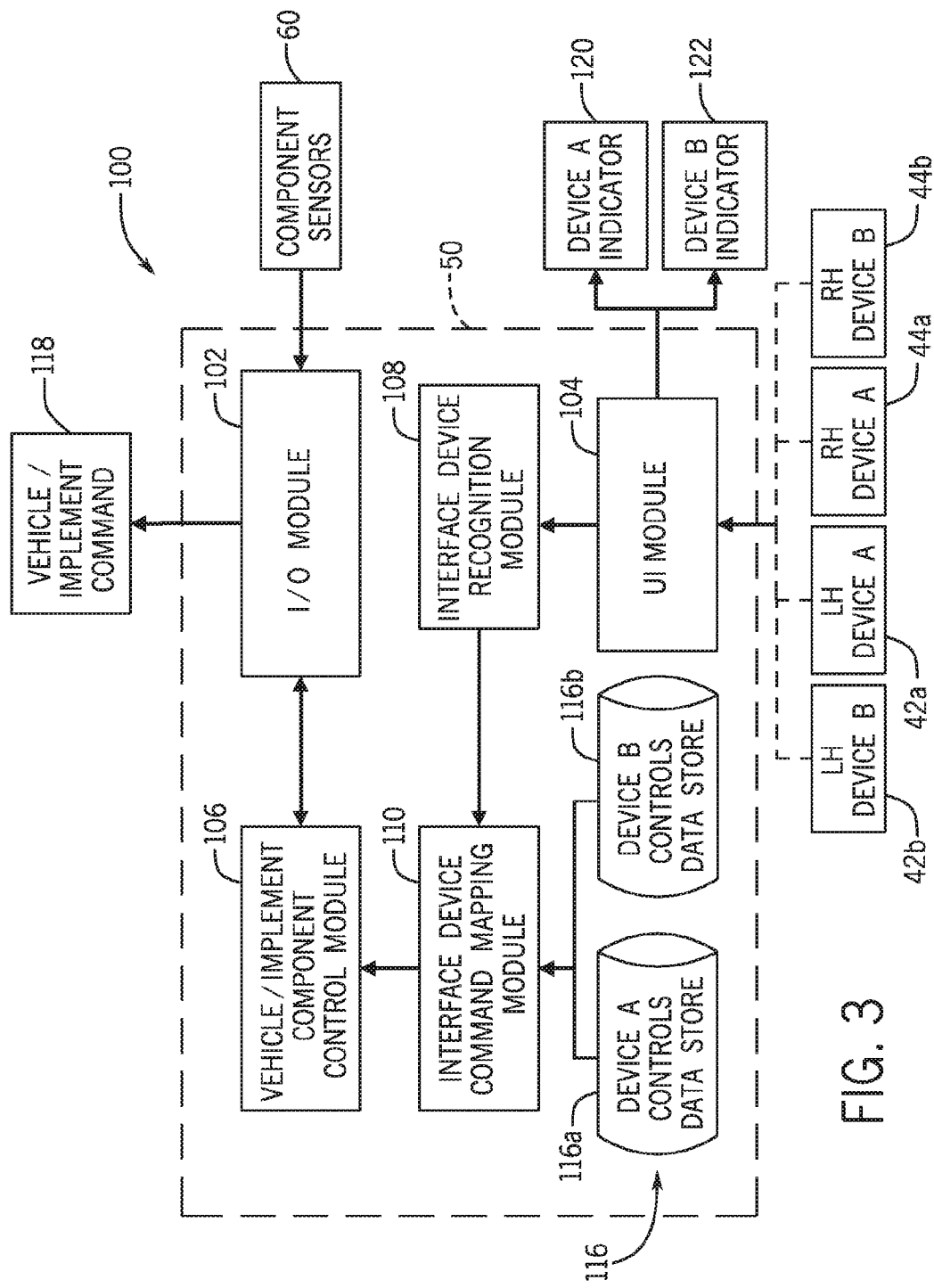
FIG. 3 is an example dataflow diagram for an example two-device interchangeable operator interface system according to this disclosure.

Referring also to FIG. 3, an example control system 100, shown as a simplified schematic diagram, may be embedded within the controller 50. FIG. 3 shows an example two-device operator interface system. It will be understood, however, that the control system may be configured to include or coordinate with a single interface device or with three or more such devices. The system represented in the figures is thus illustrative and not limiting in this regard.

Various embodiments of the control system 100 according to the present disclosure may include any number of other modules or sub-modules (e.g., a grade control module) embedded within the controller 50 that may be combined and/or further partitioned. Inputs to the control system 100 may be received from the sensors 60, the interface devices 42, 44 and various other devices associated with the work vehicle 10, and/or determined/modeled by other sub-modules (not shown) within the controller 50 (or other controllers). In various embodiments, the controller 50 includes an input/output (I/O) module 102, a user interface (UI) module 104, a vehicle and implement component control (CC) module 106, and an interface device module or modules, which, for example, may include an interface device recognition (IDR) module 108, an interface device command mapping (IDC) module 110 and one or more device controls data stores 116.

The I/O module 102 and the UI module 104 receive input data from one or more sources. The I/O module 102 may receive input data in the form of feedback signals from one or more of the sensors 60 associated with the actuators 24, 26, 28 or other devices (e.g., input data in the form of coordinate signals from a GPS or other device). The UI module 104 receives input data from the operator via the interface devices 42, 44. Ultimately, the UI module 104 and the I/O module 102 receive and transmit the input data to the CC module 106, which, according to the programmed control logic, will resolve one or more machine control commands. The CC module 106 generates, and transmits via the I/O module 102, commands 118 to move the vehicle and/or implement components, which include a corresponding command signal (e.g., current, voltage, etc.) with the applicable control parameters (e.g., duration, amplitude, etc.) to control one or more of the control valves to control hydraulic flow to the actuators associated with the machine components.

The input data from the interface devices 42, 44 may include any of various control inputs, including, for example, the control inputs discussed with regard to the example interface devices detailed below. It will be understood that the control system 100 may be configured for use with any electronic interface device that has been adapted to couple to the system and is suitable to control the various (electric, electro-hydraulic, electro-pneumatic, etc.) valves and actuators used to position and otherwise control the vehicle and implement components. Generally, the controls may be of any suitable type (e.g., push-buttons, toggles, rockers, rollers, single- or multi-axis joysticks and so on) providing a single, dedicated control operation or providing multi-operational control. The control inputs may provide a single control input signal for each time it is actuated, or it may provide multiple control input signals either sequenced in series or in parallel. Moreover, the control inputs of the interface devices 42, 44 and the controller 50 may be configured to implement manual or semi- or fully automated operations. The term "manual" (and derivatives) are used herein to mean that the machine components are being directed by the operator via the interface devices 42, 44 at least before or during the operation of the associated component or components. Semi-automated or automatic control schemes of the control system 100 may be initiated by a single input control signal from the interface devices 42, 44 to cause a multi-part or packeted signal, or a set of multiple signals, to be sent as inputs to the controller 50, which in turn may be configured to send multiple command signals to one or more machine components without necessarily requiring further input from the operator.

In certain embodiments, the UI module 104 may also output one or more notifications to the control display 40 (e.g., in the form of audible, tactile and/or visual notifications) to notify the operator of one or more aspects of the interface devices, for example, including an indication (e.g., indicators 120, 122) of the interface devices have been identified by the controller 50. The UI module 104 may output other data to the operator, including various machine state data and sensor feedback, via other indicators (not shown).

As mentioned, the control system 100 depicted schematically in FIG. 3 is a two-device operator interface system. Further, the illustrated control system 100 is configured to interchange two sets of two such interface devices. As with the number of interface devices used by the operator, the number of interchangeable sets of interface devices (or individual interchangeable interface devices) may vary, including three or more sets of interface devices (or individual interchangeable interface devices). For purposes of this discussion, then, the interface devices 42, 44 of the control system 100 will include a set of left and right "Device A" devices and a set of left and right "Device B" devices, which will be referenced as interface devices 42*a*, 44*a* and 42*b*, 44*b*, respectively. The interface devices 42*a*, 44*a* and 42*b*, 44*b* will be understood as being operatively coupled to the controller 50 via a network bus using a standard vehicle communication protocol, such as a standard or high-speed Controller Area Network (CAN) bus. However, the interface devices 42*a*, 44*a* are operatively coupled to the controller 50 only when the interface devices 42*b*, 44*b* are not operatively coupled to the controller 50. In certain embodiments, it may be possible to configure the control system 100 such that both sets of interface devices 42*a*, 44*a* and 44*a*, 44*b* are physically coupled to the controller 50 (e.g., via the network bus), but one set of interface devices is interpreted by the controller 50 as disconnected or otherwise inactive. However, in certain embodiments, such as described in detail below, the alternative operation of the sets of interface devices 42*a*, 44*a* and 42*b*, 44*b* is effected by physically disconnecting one set and exchanging the disconnected set with an alternative set (e.g., disconnecting interface devices 42*a*, 44*a* and connecting interface devices 42*b*, 44*b*), which is signified by the broken lines in FIG. 3.

Although not addressed in detail herein, it should be understood that in still other hybrid embodiments the control system 100 may be configured to be simultaneously operatively connected (as well as physically connected or disconnected) to a subset of devices from multiple sets of interface devices (e.g., one each of Device A and Device B devices).

Moreover, the Device A and Device B devices represent operator interface devices that provide varied or alternative control schemes by which an operator interfaces with the work vehicle 10 to control its movements and implements. Device A and Device B devices may differ in any of various ways related to the configuration of the interfaces devices, including, for example, one or more of the following: (i) the physical shape of the device at the region that it is manipulated by an operator, (ii) the number, type, position (absolute or relative), or pattern of control inputs (e.g., buttons, knobs, joysticks, rollers, and so on), and (iii) the operational characteristic of the interface device or one or more of the control inputs (e.g., the type, direction and pattern of motion to implement the control of the machine). As used herein, the former two types of characteristics generally relate to the "physical layout" of the interface devices and the latter relates to the "modes of operation" of the interface devices. The control system disclosed herein may include two or more interface devices that vary by their respective physical layouts (e.g., the buttons of the different interface devices are arranged in different patterns) or by their modes of operation (e.g., one interface device has a static coordinate system and another has a dynamic coordinate system) or both (e.g., one interface device has a fixed array of buttons and another has a different array of buttons mounted on a pivoting joystick). To more clearly illustrate this, a specific example of interchan00geable operator interface devices including two joystick devices and two pod devices will be described in detail below.

In order to achieve the operational implementation and integration of varied interface devices into the control system 100 and still control the set of vehicle and implement components present on the work vehicle 10, every interface device will include at least one (e.g., if a single component is to be controlled) control input that is configured to effect the same the same function. The interface devices will have one or more control inputs (e.g., all or a specific subset of control inputs) with shared or common functionality. Other control inputs may be included in the various interface devices, but it is the control signals from these one or more functionally "common" control inputs that the control system processes, and possibly modifies, in order to effect the movement of the applicable set of machine components in an intended manner regardless of which particular interface device is employed. Further, the control system processes these common control inputs not only to effect the intended movement, but to implement the control associated with a particular interface device in a consistent, expected, user-friendly manner. The interchangeable joystick and pod devices described in detail below will provide an example of two sets of control inputs with at least a subset of functionally common control inputs.

In certain embodiments, the control system 100 may be configured to automatically detect or recognize when the interface devices are mounted or have been changed, and then initialize the newly mounted interface devices for use. Viewing FIG. 3 as physically and operatively connecting the Device A interface devices 42a, 44a, for example, as explained above, control input signals from the interface devices 42a, 44a are received by the UI module 104 after which the IDR module 108 identifies the physical presence or connection of one of interface devices 42a, 44a and identifies the type of interface device (e.g., Device A) that is mounted to the control system 100. For example, with the interface devices 42a, 44a each connected to the controller 50 via the network bus, the IDR module 108 may scan a particular node location address or range of addresses of the network for a corresponding value or signal at that address or range of addresses. The Device A devices may have hardware connections that connect to the scanned address or addresses, while Device B devices do not. The IDR module 108 thus will identify the mounted interface devices as Device A devices (i.e., interface devices 42a, 44a). Alternatively or additionally, the IDR module 108 may scan other known addresses (e.g., addresses associated with hardware connections for Device B devices) and process the absence of a value or signal at that those addresses as meaning that Device B devices are not mounted, and by subtraction, that Device A devices are mounted. Once identified, the IDR module 108 may generate (and provide to the IDC module 110) an ID tag or other marker identifying which interface devices are mounted. Dismounting the Device A devices and mounting the Device B devices causes the IDR module 108 to undergo similar process to identify and tag the interface devices 42b, 44b.

After recognition, the IDC module 110 then sets out to coordinate the control system 100 with the control inputs known to be included in the mounted interface devices. For example, the IDC module 110 may access a table of commands in the data store 116, specifically, in a data store 116a for the interface devices 42a, 44a and a data store 116b for the interface devices 42b, 44b. The IDC module 110 may then use the stored command set to provide the controller 50 with a map of the control signals originating from each control input of each interface device at the network address to which each control input is assigned. Thus, for example, the IDC module 110 will represent a particular value or signal from a steering control input as corresponding to a wheel control signal indicating that a wheel control command needs to be executed.

In certain embodiments, the controller 50 may be configured to modify one or more parameters of the input signals from one or more control inputs. The controller 50 may accomplish such signal modification at the IDC module 110 by processing control algorithms stored in the data store 116 or at another location. The IDC module 110 may scale up or down the value (e.g., voltage) of an input signal of a control input (e.g. a roller control) from a Device A device compared to the input signal from a counterpart control input (e.g., a joystick control) from a Device B device. Various parameters may be modified as necessary or desired, include control parameters such as: a range of motion of the control, a dead band of the control, a center position of a control and a metering value associated with the control signal.

For example, the controller 50 may be configured with control logic causing the IDC module 110 to modify the value of the input signal issued from moving a particular control input of one of the interface devices a certain distance or range of motion (e.g., pivoting a joystick about an axis X degrees) so as to output a control command that effects the desired movement of the associated machine component (e.g., supplies a particular current to the coil of the associated control valve). In this example, the IDC module 110 may modify the input signal such that the output command has a different absolute value or resolution, varying either linearly or non-linearly, with respect to a particular travel distance or pivot angle through which the control input is moved by the operator. The IDC module 110 may, for example, modify the input signal such that an X percent (e.g., one percent) change in linear or angular travel distance of a particular control input of a Device A device corresponds to a Y percent (e.g., five percent) change in linear or angular travel distance of a different control input of a Device B device. The IDC module 110 may make such modifications throughout the entire range of motion of the control input, and thus change the entire metering curve of that (or other) control input. In a similar manner, the IDC module 110 may process control logic that alters the effective range of motion of various control inputs, alters the dead band of various control inputs, and/or shifts the center position of various control inputs. Modifying the input signals in these or other ways allows the control system 100 to resolve input signals that originate from moving varied control inputs into output commands at or approximating the value and resolution of that of a dedicated (i.e., non-interchangeable) interface device, thereby giving the operator the feel and responsiveness expected of that interface device.

In certain embodiments, a mounting arrangement may be provided for the direct physical substitution of one interface device for another in which each of the interface devices has a common mounting interface by which they may be alternatively connected to a common mounting arrangement, such one or more device docks within the vehicle cabin. The interface devices and docking arrangement may have complementary, male-female mounting interfaces and provide for direct operational (e.g., electrical) coupling of the control inputs of each interface device with the control system 100 without requiring further connections or calibrations to be made by the operator.

Figure 4:
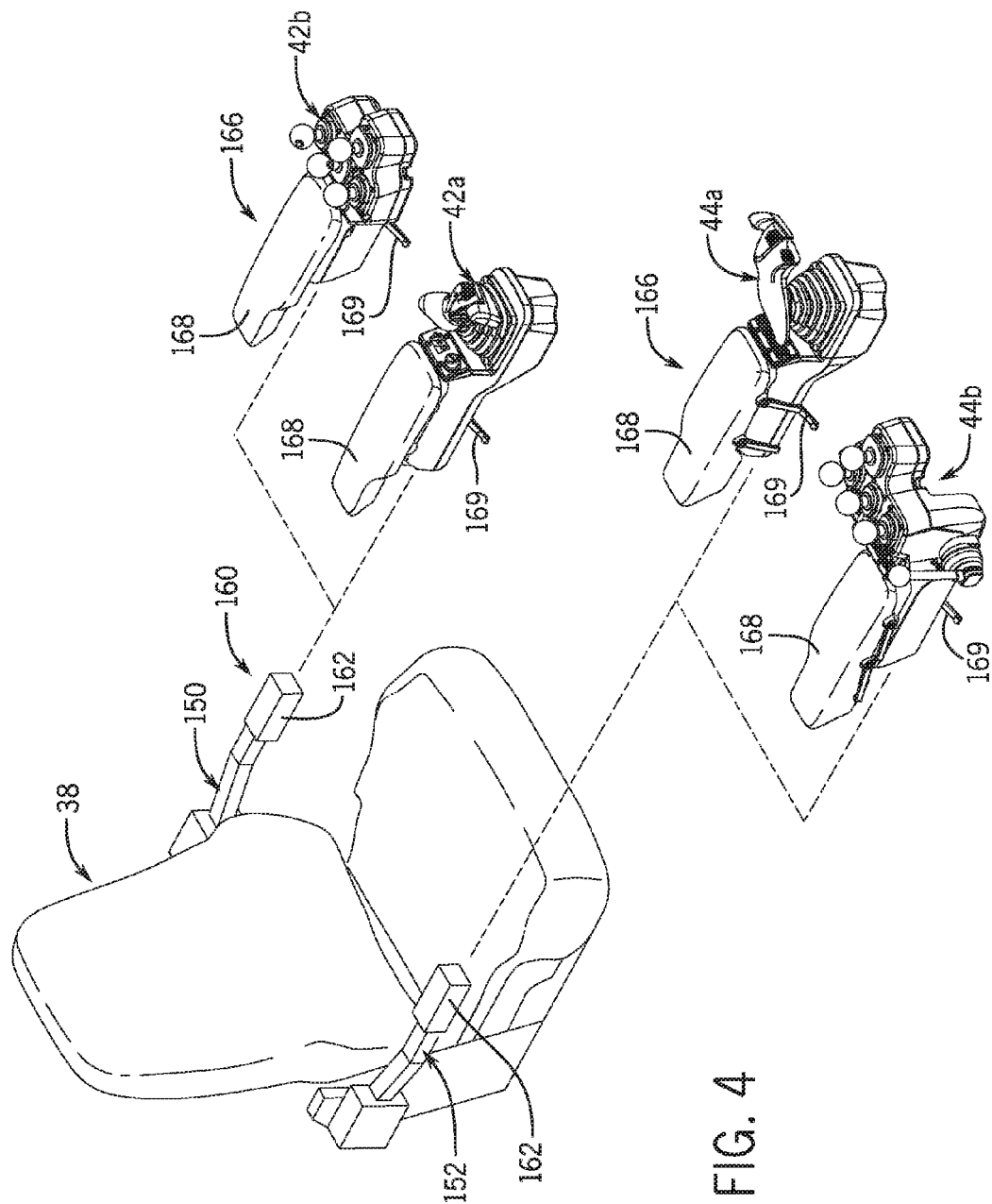
FIG. 4 is a perspective assembly view showing an example operator seat including an interchangeable operator interface system with two sets of example operator interface devices, namely a set of joystick devices and a set of pod devices, shown exploded from the operator seat.
Figure 5A:
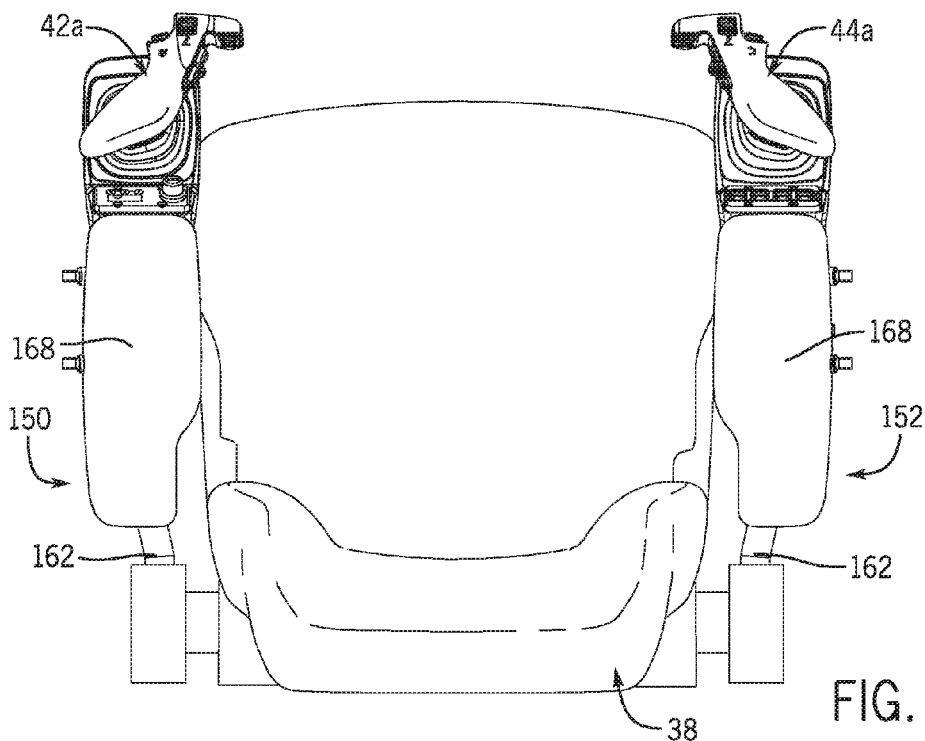
FIGS. 5A and 5B are top views of the operator chair of FIG. 4 with the joystick devices shown mounted to the operator seat in FIG. 5A and the pod devices shown mounted to the operator seat in FIG. 5B.
Figure 5B:
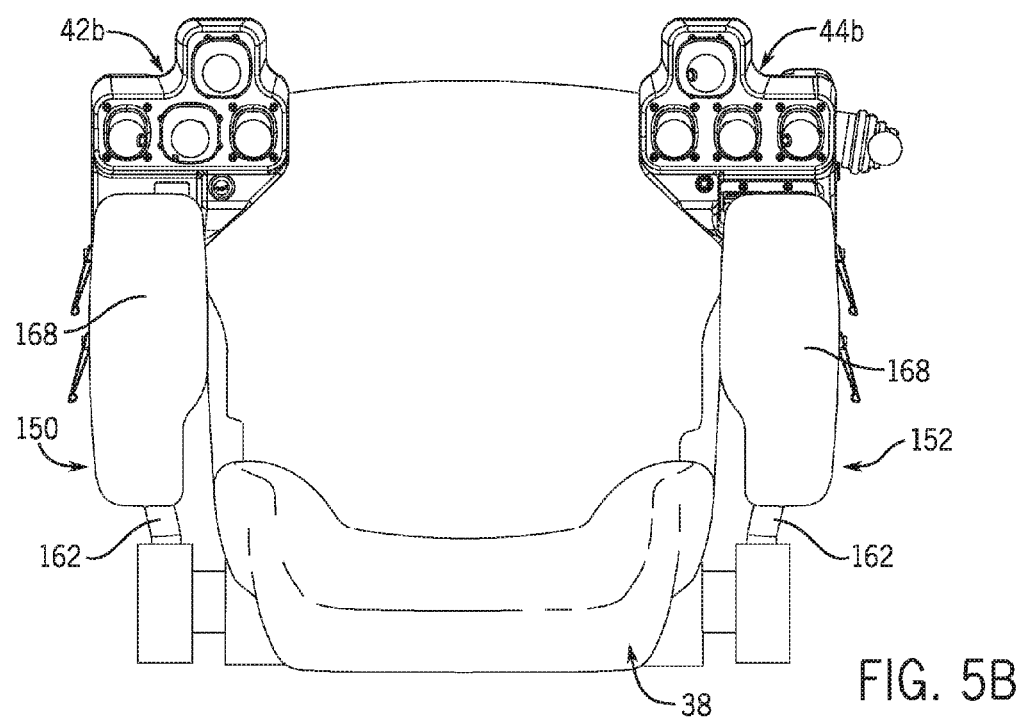
Figure 6:
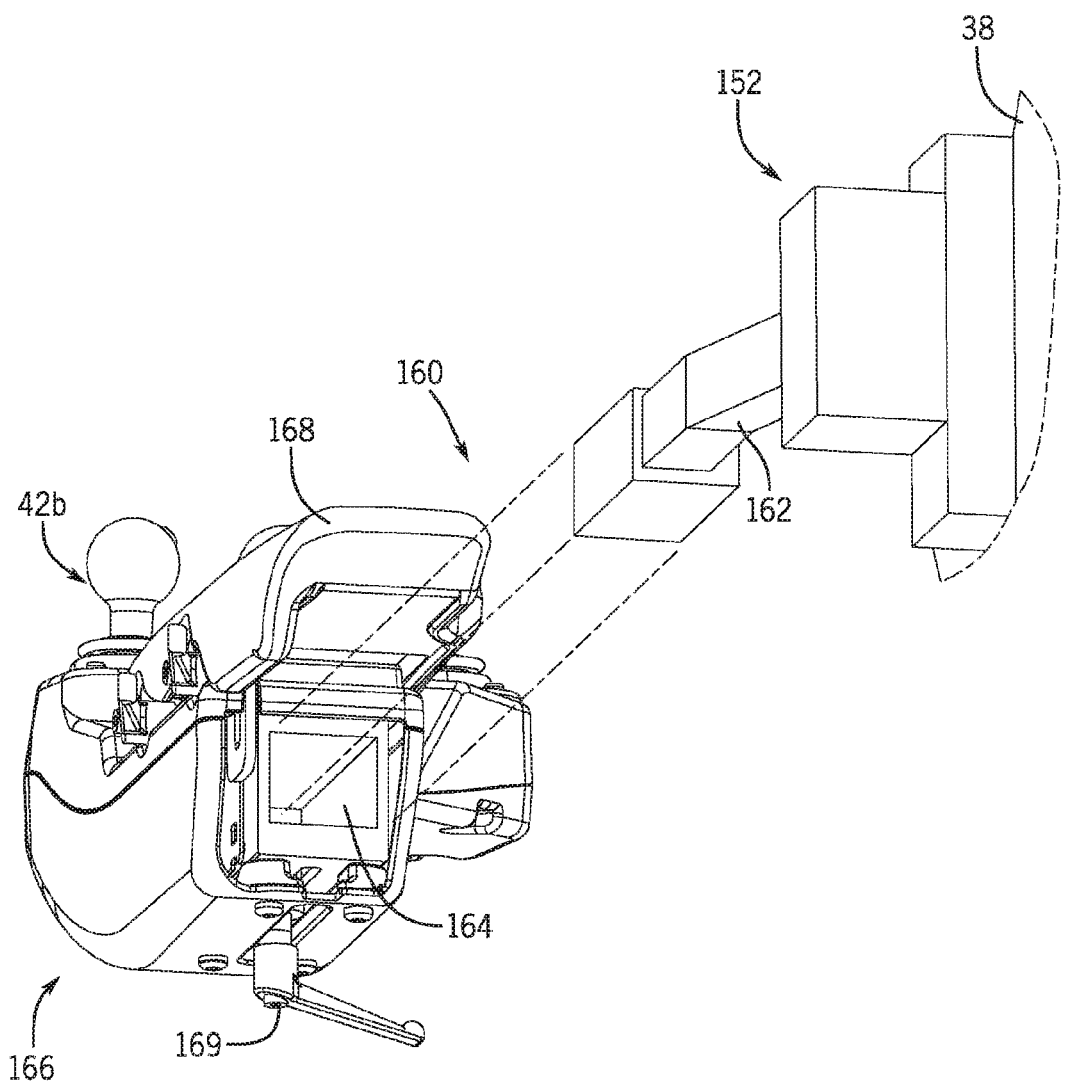
FIG. 6 is an enlarged, partial reverse perspective view showing mounting of a right-hand pod device.

An example docking arrangement located at the arm rests of the operator seat 38 is illustrated in FIGS. 4-6. In this example, the operator seat 38 has arm rests 150, 152 that are adjustably mounted to supporting framework of the operator seat 38. The arm rests 150, 152 define a docking arrangement 160 for the interface devices 42a, 44a and 42b, 44b in which each arm rest 150, 152 includes a (male) frame or rail member 162 that is received in a (female) socket 164 of a modular assembly 166 that includes an upper arm support 168 along its length at the distal end of which is the associated interface device. Note that the gender of the interface devices 42a, 44a and 42b, 44b and the docking arrangement 160 may be reversed. To aid in mounting, the rail member 162 and the socket 164 cooperate to define a track along which the modular assembly 166 slides. Latching and unlatching mechanisms 169 may be provided, such that after the rail member 162 is fully seated in the socket 164, the modular assembly 166 is physically interlocked with the operator seat 38. The latching/unlatching mechanisms 169 may be configured either to latch when seated and be manually released or be manually latched and released by the operator.

Further, although not shown, electrical terminals may be provided at the mounting interface (e.g., at contacting areas of the rail member 162 and the socket 164) such that electrical coupling of each interface device is made upon mounting. Alternatively, electrical connections may be made at another location (e.g., a wire harness connection) of the network bus. In either case, as mentioned above, the control system 100 is configured to auto-detect the interface devices and initialize the control inputs upon mounting. Thus, the interface devices are interchanged in an intuitive plug-and-play type manner.

Once mounted, the modular assemblies 166 provide left and right arm rests for the operator seat 38 with the interface devices 42a, 44a (or 42b, 44b) ready for operation. As shown in FIGS. 5A and 5B, both sets of interface devices are mounted in essentially the same position relative to the operator seat 38 within reach of the operator with his or her forearms resting on the arm supports 168.

With reference also to FIGS. 7A-8B, an example of the aforementioned control system 100 will now be further described in which the interface devices 42a, 44a are left-hand and right-hand multi-axis joystick devices and the interface devices 42b, 44b are left-hand and right-hand joystick pod devices. It will be understood that the example joystick and pod devices described are not limiting as these and other interface devices may be utilized. Further, it will be understood that the example joystick and pod devices represent particular examples of devices that differ in terms of both the physical layout and mode of operation of their control inputs. Generally, as will be described, the physical layout of the control inputs and the type and configuration of the control inputs themselves vary among and between the different interface devices. Also, the joystick devices have control inputs that move or are actuated (some independently) within coordinate systems that move with respect to one another by virtue of the multi-axis pivotal connection of these control inputs to the bases of the joystick devices. The pod devices, on the other hands, have control inputs that move or are actuated within coordinate systems that are fixed or stationary with respect to the base of the associated pod device.

The joystick devices 42a, 44a may be configured for pivotal movement about X and Y axes, for example, the "X" axis may be aligned with the side-to-side direction of the work vehicle 10, and the "Y" axis may be aligned with the fore-aft direction of the work vehicle 10, generally perpendicular to the side-to-side direction. The joystick devices 42a, 44a may further be configured to return to center, or a neutral input position, (e.g., by spring bias) when not being manipulated manually.

In certain embodiments, the joystick devices 42a, 44a may have ergonomic, palm-on-top style grips with prescribed control input sets that are selected and arranged to enhance the operator experience and the control of the work vehicle. Generally, the control inputs may be evenly distributed across the joystick devices 42a, 44a to give the operator a balanced experience in which both hands share the control duty more or less evenly such that one hand is less likely to be overloaded and fatigue prematurely. The control input sets may also be selected and arranged to facilitate certain long-cycle time operations or complex or multi-step operations that may require multiple control inputs to be executed in a specific sequence or simultaneously.

Specifically now, referring to FIGS. 7A and 7B, the left-hand joystick device 42a has a circle shift control 170 and an auxiliary implement control 172 (e.g., for a ripper attachment) located at a forward area of the grip. The circle shift control 170 and the implement control 172 may each be a proportional roller type switch with a protruding "paddle" feature and that is spring-biased to return to center (i.e., a neutral input position). By way of example, when the operator moves the roller control of the circle shift control 170 forward (away from the operator), the controller 50 may actuate the circle shift actuator (not shown) to pivot the lifter bracket 34 about the main frame 12 to swing the circle 22, and thereby the blade 30, out to the operator's right side. Moving the roller control in the opposite direction (toward the operator) may swing the circle 22, and the blade 30, to the operator's left side. Continuing, the joystick device 42a includes gear down 174 and gear up 176 control inputs, a transmission control input 178, and a circle rotate control input 180. The gear down 174 and gear up 176 control inputs may each be spring-biased push-button type switches that return to their original position after being depressed, and the transmission control input 178 may be a three-position rocker switch, including a central "neutral" transmission position between "forward" and "reverse" transmission positions. The circle rotate control input 180 may be a proportional roller control, for example, rotating the circle 22, and thereby the blade 30, clockwise by moving the switch forward or away from the operator, and rotating the circle 22 and the blade 30 counter-clockwise by moving the switch rearward. The joystick device 42a may also include an undefined control input 182 (e.g., a spring-biased push-button switch) that may be operator assignable via the control display 40.

As noted, the above control inputs are mounted to a single, multi-axis pivoting joystick 184. Pivoting the joystick 184 about the Y axis may generate a steering input to the controller 50 for turning the steered wheels 18, and thereby controlling the heading of the work vehicle 10. For example, pivoting the joystick 184 to the left of the Y axis may provide a left turn control input, and pivoting the joystick 184 to the right of the Y axis may provide a right turn control input. Pivoting the joystick 184 about the X axis may control the height of the left end of the blade 30 (e.g., by raising and lowering the left side of the circle 22). For example, pivoting the joystick 184 forward with respect to the X axis may generate a left end blade lift control input, and pivoting the joystick 184 rearward with respect to the X axis may provide a left end blade lower control input. The joystick 184 may be pivoted about the X and Y axes simultaneously to effect the noted inputs and actuations simultaneously, and the joystick 184 may be biased to return to center (i.e., a neutral input position).

The right-hand joystick device 44a, in the illustrated example, has a blade pitch control input 190 and an auxiliary implement control input 192 (e.g., for a scarifier attachment) located at a forward area of the grip. The blade pitch control input 190 and the implement control input 192 may each be a proportional roller type switch with a paddle and that is spring-biased to return to center (i.e., a neutral input position). For example, when the operator moves the roller control of the blade pitch control input 190 forward (away from the operator), the controller 50 may cause the blade actuator(s) to tilt an upper edge of blade 30 forward with respect to its lower edge. Moving the roller control in the opposite direction (toward the operator) may cause the blade 30 to tilt the upper edge rearward with respect to its lower edge. The joystick device 44a also has a chassis return to center control input 194, a differential lock control input 196, an articulation control input 198, a wheel lean control input 200 and a user-definable control input 202. The chassis return to center control input 194 and the differential lock control input 196 may each be spring-biased push-button type switches that return to their original position after being depressed. The articulation control input 198 and the wheel lean control input 200 may each be a proportional roller type switch with a paddle and that is spring-biased to return to center (i.e., a neutral input position), and the control input 202 may be a recessed, push-button switch that may be operator assignable via the control display 40.

Like the left-hand joystick device 42a, the above control inputs are mounted to a single, multi-axis pivoting joystick 204. Pivoting the joystick 204 about the Y axis may generate a blade shift input to the controller 50 for moving the blade 30 laterally left and right. For example, pivoting the joystick 204 to the left of the Y axis may provide a left blade shift control input, and pivoting the joystick 204 to the right of the Y axis may provide a right blade shift control input. Pivoting the joystick 204 about the X axis may control the height of the right end of the blade 30 (e.g., by raising and lowering the right side of the circle 22). For example, pivoting the joystick 204 forward with respect to the X axis may provide a right end blade lift control input, and pivoting the joystick 204 rearward with respect to the X axis may provide a right end blade lower control input. Like the joystick 184, the joystick 204 may be pivoted about the X and Y axes simultaneously to effect the noted signals and actuations simultaneously and may be biased to return to center (i.e., a neutral input position).

In certain embodiments, the joystick devices 42a, 42b may have supplemental control areas for additional controls. In the illustrated example, the joystick devices 42a, 42 include Integrated Grade Control (IGC) mode control inputs 212, 214, IGC up control inputs 216, 218 and IGC down control inputs 220, 222. The IGC-related controls may each be a spring-biased push-button switch. As will be understood by one of skill in the art, the IGC functionality provides a sensor-based system for setting and adjusting the height and/or orientation of the blade 30 with respect to the ground. The IGC system is activated and deactivated by depressing either IGC mode control 212, 214. The IGC mode may be canceled by depressing either IGC mode control 212, 214 while already in the IGC mode. In a manual mode, the IGC up control 216, 218 and IGC down control 220, 222 may be used to raise and lower the circle 22 and the blade 30, including to make changes to the slope of the blade 30.

Referring to FIGS. 8A and 8B, the various individual joysticks of the pod devices 42b, 44b may be configured for pivotal movement about one or both of the X and Y axes, which again may be generally aligned with the side-to-side and fore-aft directions of the work vehicle 10, respectively. The joysticks may further be configured to return to center, or a neutral input position, (e.g., by spring bias) when not being manipulated manually. In the illustrated example, the pod devices 42b, 44b each include a bank for four joysticks, as will now be described.

As noted, the left-hand pod device 42b has four compact joysticks 230, 232, 234 and 236. The joystick 230 is a dual-function, dual-axis joystick configured to provide a blade pitch control input that tilts the blade 30 in the fore-aft direction of the work vehicle 10 by pivoting the joystick 230 forward and backward about its X axis, and to provide an implement control input (e.g., to move a ripper (not shown)) by pivoting the joystick 230 to the left and right about its Y axis. The joystick 232 is a single function, single axis joystick configured to provide a circle rotate (or blade angle) control input that rotates the circle 22 (e.g., by the circle drive 28) by pivoting the joystick 232 forward and backward about its X axis. The joystick 234 is a dual function, dual axis joystick configured to provide a blade shift control input that shifts the blade 30 laterally 10 by pivoting the joystick 234 forward and backward about its X axis, and to provide a steering control input for changing the heading of the steered wheels 18 by pivoting the joystick 234 to the left and right about its Y axis. The joystick 236 is a single function, single axis joystick configured to provide a blade height control input to raise/lower the height of the left end of the blade 30 by pivoting the joystick 236 forward and backward about its X axis. In addition to the individual joysticks described, the pod device 42b may also include a horn control input (e.g., push button switch 238) and various auxiliary and blade float controls (e.g., rocker switches 239).

As with the left-hand pod device 42*b*, the right-hand pod device 44*b* has four compact joysticks 240, 242, 244 and 246. The joystick 240 is a dual function, dual axis joystick configured to provide an articulation control input that articulates of the main frame 12 of the work vehicle 10 by pivoting the joystick 240 forward and backward about its X axis, and to provide an implement control input (e.g., to raise and lower the scarifier 36) by pivoting the joystick 240 to the left and right about its Y axis. The joystick 242 is a single function, single axis joystick configured to provide a circle shift control input that shifts the circle 22 laterally by pivoting the joystick 242 forward and backward about its X axis. The joystick 244 is also a single function, single axis joystick configured to provide a wheel lean control input to move lean the steered wheels 18 of the work vehicle 10 laterally by pivoting the joystick 242 forward and backward about its X axis. The joystick 246 is a single function, single axis joystick configured to provide a blade height control input to raise/lower the height of the right end of the blade 30 by pivoting the joystick 246 forward and backward about its X axis. In addition to the individual joysticks described, the pod device 44*b* may also include a differential lock control input (e.g., push button switch 248) for locking and unlocking the differential of the work vehicle 10. The pod device 44*b* may include still other control inputs, including various auxiliary controls (e.g., multi-axis mini-joystick controls 250).

In the example interface devices just described there is provided a set of control inputs that are common to both the joystick devices 42*a*, 44*a* and the pod devices 42*b*, 44*b*. Specifically, in this example, both sets of interface devices include control inputs for wheel steer, wheel lean, articulation, blade lift, circle rotate and differential lock. Of course, control inputs for other functions and operations could be included (either more or less) in the common set of control inputs. From the explanation above, it will be understood that one or more of the control inputs that are common to both of the joystick devices 42*a*, 44*a* and the pod devices 42*b*, 44*b* are arranged in different positions relative to the operator and/or other control inputs and are implemented or actuated by the operator in different ways.

Consider the wheel lean control inputs for instance. Using the joystick devices 42*a*, 44*a*, the steered wheels 18 are leaned laterally by the operator manipulating the paddle roller control 200 on the right-hand joystick device 44*a* with his or her right thumb in a thumb flexing or extending motion. To effect wheel lean with the pod devices, however, the operator uses his or her right-hand to pivot the joystick 244 of the right-hand pod device 44*b* forward and backward about its X axis. A similar set of motions and differences arises when the operator performs a vehicle chassis articulation operation, however, here using paddle roller control 198 on the right-hand joystick device 44*a* and the joystick 240 on the right-hand pod device 44*b*. Thus, the operator uses two thumb wheels in the case of the joystick devices and two joysticks in the case of the pod device, and thus there are distinct differences in the operator movements required to operator these controls. Each movement uses a different muscle or muscle group and has a different range of motion. One motion may be familiar to one operator and but not to another operator. Apart from this, the differences in the movements required by the operator to operator the controls becomes even more significant when multiple components are controlled consecutively or simultaneously, which is often the case with the articulation and wheel lean operations in a motor grader. Skilled operators may be able perform simultaneous articulation and wheel lean operations using other interface device, however, likely one or the other will preferred by a given operator. Accordingly, despite their varied control arrangements and modes of operation, the control system 100 is compatible (physically and operationally) with the different interface devices so as to suit operator preference.

Thus, various example embodiments of the disclosed control system have been described in which multiple (or multiple sets of) operator control interface devices may be interchanged with one another and used to control various components of the work vehicle. The interface devices may have different physical layouts or modes of operation, which gives an operator an option of the control arrangement, used to operator the work vehicle, including interface devices that the operator may have previously gained experience and proficiency. The interface devices may be interchanged with one another in plug-and-play fashion using an arm rest docking station in the operator seat. All necessary electrical connections, and all necessary recognition and initialization routines, may be made upon docking the interface devices without further calibration or set-up required by the operator. The control system may also modify one or more parameters of certain control inputs of the interface devices to provide optimized actuation and feel for the operator.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An interchangeable operator interface system for a work vehicle, comprising:
    at least one controller;
    at least one operator interface device selected from a plurality of operator interface devices each having a plurality of controls; and
    at least one docking arrangement configured to removably mount the operator interface device to physically connect to the work vehicle and operatively couple to the controller such that, when the operator interface device is removed from the docking arrangement, the docking arrangement is configured to removably mount another of the interface devices to physically connect to the work vehicle and operatively couple to the controller;
    wherein at least one of the operator interface devices has at least one common control that operates in one or more of a different mode of operation and a different physical layout on the associated operator interface device than that of another at least one common control of another of the operator interface devices, the controller being configured to effect at least one common change in state of at least one component of the work vehicle upon receiving a control input from each of the at least one common controls of the associated operator interface devices.

2. The system of claim 1, wherein there is a single docking arrangement for alternatively removably mounting the operator interface devices.

3. The system of claim 1, wherein one of the operator interface devices is a multi-joystick pod and another of the operator interface devices is a single joystick having a plurality of controls.

4. The system of claim 1, wherein there are first and second operator interface devices and first and second docking arrangements; and
    wherein the first and second operator interface devices are mounted to the respective first and second docking arrangements to physically connect to the work vehicle and operatively couple to the controller.

5. The system of claim 1, wherein the docking arrangement includes a mounting interface; and
    wherein the operator interface devices each have a complementarily configured mounting interface such that each of the operator interface devices is mountable to the docking arrangement.

6. The system of claim 1, wherein the controller is configured to recognize which of the operator interface devices is mounted to the docking arrangement.

7. The system of claim 6, wherein, upon receipt of a control signal from the at least one common control of one of the operator interface devices, the controller is configured to output a modified component control command that is modified with respect to one or more control parameters based upon the configuration of the associated at least one common control.

8. The system of claim 7, wherein the control parameters include: a range of motion of the control, a dead band of the control, a center position of a control and a metering value associated with the control signal.

9. The system of claim 1, wherein the work vehicle is a motor grader; and
wherein the at least one common control includes a transmission gear change control, a wheel steer control, a wheel lean control, a chassis articulate control, a circle rotate control, a circle shift control, a blade shift control, and a blade height control.

10. The system of claim 1, wherein one of the operator interface devices has a base and a static coordinate system for one or more of its plurality of controls that is fixed with respect to its base; and
wherein another of the operator interface devices has a base and a dynamic coordinate system for one or more of its plurality of controls that is movable with respect to its base.

11. An interchangeable operator interface system for a work vehicle, comprising:
at least one controller;
a set of left-hand and right-hand operator interface devices selected from a plurality of operator interface devices and each having a plurality of controls; and
a set of left-hand and right-hand docking arrangements configured to removably mount the left-hand and right-hand operator interface devices to physically connect to the work vehicle and operatively couple to the controller;
wherein, the left-hand and right-hand docking arrangements are configured such that, when the left-hand and right-hand operator interface devices are removed from the left-hand and right-hand docking arrangements, the left-hand and right-hand docking arrangements removably mount another set of left-hand and right-hand operator interface devices to physically connect to the work vehicle and operatively couple to the controller;
wherein one set of left-hand and right-hand operator interface devices has at least one common control that operates in one or more of a different mode of operation and a different physical layout than that of at least one common control of another set of left-hand and right-hand operator interface devices; and
wherein the controller is configured to effect at least one common change in state of at least one component of the work vehicle upon receiving a control input from each of the at least one common controls of the associated set of left-hand and right-hand operator interface devices.

12. The system of claim 11, wherein one set of left-hand and right-hand operator interface devices is a set of multi-joystick pods and another set of left-hand and right-hand operator interface devices is a set of single joystick each having a plurality of controls.

13. The system of claim 11, wherein each docking arrangement includes a mounting interface; and
wherein the operator interface devices each have a complementarily configured mounting interface such that each left-hand operator interface device is mountable to the left-hand docking arrangement and each right-hand operator interface device is mountable to the right-hand docking arrangement.

14. The system of claim 11, wherein the controller is configured to recognize which set of left-hand and right-hand operator interface devices is mounted to the left-hand and right-hand docking arrangements.

15. The system of claim 14, wherein, upon receipt of a control signal from the at least one common control of one set of left-hand and right-hand operator interface devices, the controller is configured to output a modified component control command that is modified with respect to one or more control parameters based upon the configuration of the associated at least one common control.

16. The system of claim 15, wherein the control parameters include: a range of motion of the control, a dead band of the control, a center position of a control and a metering value associated with the control signal.

17. The system of claim 11, wherein the work vehicle is a motor grader; and
wherein the at least one common control includes a transmission gear change control, a wheel steer control, a wheel lean control, a chassis articulate control, a circle rotate control, a circle shift control, a blade shift control, and a blade height control.

18. The system of claim 12, wherein in one set of left-hand and right-hand operator interface devices, each operator interface device has a base and a static coordinate system for one or more of its plurality of controls that is fixed with respect to its base; and
wherein in another set of left-hand and right-hand operator interface devices, each operator interface device has a base and a dynamic coordinate system for one or more of its plurality of controls that is movable with respect to its base.

19. An interchangeable operator interface system for a work vehicle, comprising:
at least one controller;
an operator interface device having a plurality of controls configured to send control signals to the controller;
an alternative operator interface device having a plurality of controls configured to send control signals to the controller; and
at least one docking arrangement configured to alternatively removably mount the operator interface device and the alternative operator interface device so that each is alternatively physically connected to the work vehicle and alternatively operatively coupled to the controller;
wherein the operator interface device has at least one common control that operates in one or more of a different mode of operation and a different physical layout than that of at least one common control of the alternative operator interface device, the controller being configured to effect at least one common change in state of at least one component of the work vehicle upon receiving a control input from each of the at least one common controls of the associated operator interface devices.

20. The system of claim 19, wherein the operator interface device has a base and a static coordinate system for one or more of its plurality of controls that is fixed with respect to its base; and
wherein the alternative operator interface device has a base and a dynamic coordinate system for one or more of its plurality of controls that is movable with respect to its base.

* * * * *